US011836599B2

(12) United States Patent
Evans et al.

(10) Patent No.: US 11,836,599 B2
(45) Date of Patent: Dec. 5, 2023

(54) OPTIMIZING DATA CENTER CONTROLS USING NEURAL NETWORKS

(71) Applicant: DeepMind Technologies Limited, London (GB)

(72) Inventors: Richard Andrew Evans, London (GB); Jim Gao, Menlo Park, CA (US); Michael C. Ryan, San Jose, CA (US); Gabriel Dulac-Arnold, Desaignes (FR); Jonathan Karl Scholz, London (GB); Todd Andrew Hester, Seattle, WA (US)

(73) Assignee: DeepMind Technologies Limited, London (GB)

( * ) Notice: Subject to any disclaimer, the term of this patent is extended or adjusted under 35 U.S.C. 154(b) by 206 days.

(21) Appl. No.: 17/331,614

(22) Filed: May 26, 2021

(65) Prior Publication Data

US 2021/0287072 A1    Sep. 16, 2021

Related U.S. Application Data

(63) Continuation of application No. 16/863,357, filed on Apr. 30, 2020, now abandoned, which is a
(Continued)

(51) Int. Cl.
*G06N 3/04* (2023.01)
*G06N 3/045* (2023.01)

(52) U.S. Cl.
CPC .................. *G06N 3/045* (2023.01)

(58) Field of Classification Search
CPC ...................................... G06N 3/045
See application file for complete search history.

(56) References Cited

U.S. PATENT DOCUMENTS 5,745,652 A * 4/1998 Bigus ............ G06F 9/5011
706/14
7,644,051 B1 * 1/2010 Moore ............ G05B 13/048
706/903

(Continued)

OTHER PUBLICATIONS

Ashrae, TC9.9 Data Center Storage Equipment—Thermal Guidelines, Issues, and Best Practices, 2015.
(Continued)

*Primary Examiner* — Selene A. Haedi
(74) *Attorney, Agent, or Firm* — Fish & Richardson P.C.

(57) ABSTRACT

Methods, systems, and apparatus, including computer programs encoded on computer storage media, for improving operational efficiency within a data center by modeling data center performance and predicting power usage efficiency. An example method receives a state input characterizing a current state of a data center. For each data center setting slate, the state input and the data center setting slate are processed through an ensemble of machine learning models. Each machine learning model is configured to receive and process the state input and the data center setting slate to generate an efficiency score that characterizes a predicted resource efficiency of the data center if the data center settings defined by the data center setting slate are adopted t. The method selects, based on the efficiency scores for the data center setting slates, new values for the data center settings.

20 Claims, 3 Drawing Sheets

Related U.S. Application Data continuation of application No. 15/410,547, filed on Jan. 19, 2017, now Pat. No. 10,643,121.

(56) References Cited

U.S. PATENT DOCUMENTS

| | | | |
|---|---|---|---|
| 10,402,733 B1* | 9/2019 | Li | G06N 20/20 |
| 2010/0076607 A1 | 3/2010 | Ahmed et al. | |
| 2012/0053925 A1 | 3/2012 | Geffin et al. | |
| 2013/0190899 A1 | 7/2013 | Slessman et al. | |
| 2017/0093639 A1* | 3/2017 | Dabbagh | H04L 41/12 |
| 2017/0187592 A1* | 6/2017 | Ghosh | H04L 43/0817 |
| 2017/0366398 A1* | 12/2017 | Mizrachi | H04L 41/40 |
| 2018/0113482 A1* | 4/2018 | Vitullo | G06N 20/20 |

OTHER PUBLICATIONS deepmind.com [online] "DeepMind AI Reduces Google Data Centre Cooling Bill by 40%," Jul. 20, 2016, Mar. 14, 2018, retrieved from URL< https://deepmind.com/blog/deepmind-ai-reduces-google-data-centre-cooling-bill-40/> 5 pages.

Li et al., "Learning-Based Power Prediction for Data Cenfre Operations via Deep Neural Networks," Proceedings of the 5th International Workshop on Energy Efficient Data Centers, Jun. 2016, 6:1-10.

static.googleusercontent.com [online] "Machine Learning Applications for Data Center Optimization," Jim Gao, 2014 [ retrieved on Mar. 14, 2018] Retrieved from Internet: URL< https://research.google.com/pubs/pub42542.html> 13 pages.

\* cited by examiner

OPTIMIZING DATA CENTER CONTROLS USING NEURAL NETWORKS

CROSS-REFERENCE TO RELATED APPLICATIONS

This application is a continuation of and claims priority to U.S. application Ser. No. 16/863,357, filed on Apr. 30, 2020, which is a continuation of U.S. application Ser. No. 15/410,547, filed on Jan. 19, 2017 (now U.S. Pat. No. 10,643,121). The disclosures of the prior applications are considered part of and are incorporated by reference in the disclosure of this application.

BACKGROUND

This specification relates to large-scale data center optimization.

A data center is a facility that holds computer servers for remote storage, processing, or distribution of large amounts of data. Using resources, e.g., energy, efficiently is a primary concern for data center operators.

SUMMARY

This specification describes technologies for data center optimization. These technologies generally involve methods and systems for applying machine learning algorithms to improve data center efficiency.

In general, one innovative aspect of the subject matter described in this specification can be embodied in methods that include the actions for improving operational efficiency within a data center by modeling data center performance and predicting power usage efficiency. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. An example method includes: receiving a state input characterizing a current state of a data center; for each data center setting slate in a first set of data center setting slates that each define a respective combination of possible data center settings that affect a resource efficiency of the data center: processing the state input and the data center setting slate through each machine learning model in an ensemble of machine learning models, wherein each machine learning model in the ensemble is configured to: receive the state input and the data center setting slate, and process the state input and the data center setting slate to generate an efficiency score that characterizes a predicted resource efficiency of the data center if the data center settings defined by the data center setting slate are adopted in response to receiving the state input; and selecting, based on the efficiency scores for the data center settings. One innovative aspect of the subject matter described in this specification can be embodied in a system comprising one or more computers and one or more storage devices storing instructions that are operable, when executed by the one or more computers to cause the one or more computers to perform operations that implement the example method. One innovative aspect of the subject matter described in this specification can be embodied in one or more non-transitory computer-readable mediums comprising instructions stored thereon that are executable by a processing device and upon such execution cause the processing device to perform operations that implement the example method.

These and other embodiments can optionally include one or more of the following features. The efficiency score can be a predicted long-term power usage effectiveness (PUE) of the data center if the data center settings defined by the data center setting slate are adopted in response to receiving the state input. The machine learning models can be configured to generate the predicted long-term PUE of the data center through training the machine learning models on training data that includes a plurality of training state inputs and, for each training state input, a target PUE that was the PUE of the data center a predetermined time after the data center was in the state characterized by the training state input. Raw training state inputs can be received and preprocessed to generate the training state inputs. The predetermined time may be greater than thirty minutes. The predetermined time may be an hour. Selecting new values for the data center settings may include: determining, for each data center setting slate, an aggregate resource efficiency score from the efficiency scores generated for the data center setting slate by the ensemble of models; determining, for each data center setting slate, a measure of variation of the efficiency scores generated for the data center setting slate by the ensemble of models; ranking the data center setting slates based on the aggregate resource efficiency scores and the measures of variation; and selecting the combination of possible data center settings defined by a highest-ranked data center setting slates as the new values for the data center settings. The aggregate resource efficiency score is a measure of central tendency of the efficiency scores generated by the ensemble of models. Ranking the data center setting slates may comprise ranking the data center slates in an exploitative manner by penalizing data center setting slates that have higher measures of variation more in the ranking than data center setting slates that have lower measures of variation. Ranking the data center setting slates may comprise ranking the data center slates in an explorative manner by promoting data center setting slates that have higher measures of variation more in the ranking than data center setting slates that have lower measures of variation. Data may identify a second set of data center setting slates and the first set of data center setting slates may be generated by removing from the second set of data center slates any data center setting slate that would, if the data center settings defined by the data center setting slate were adopted in response to receiving the state input, result in any of one or more operating constraints for the data center being violated. Generating the first set of data center setting slates may comprise, for each operating constraint: for each data center setting slate in the second set of data center setting slates: processing the state input and the data center setting slate through one or more constraint machine learning model that are specific to the operation constraint, wherein each constraint machine learning model is configured to: receive the state input and the data center setting slate, and process the state input and the data center setting slate to generate a constraint score that characterizes a predicted value of an operating property of the data center settings defined by the data center setting slate are adopted in response to receiving the state input; generating a final constraint score for each data center setting slate for the constraint scores generated by the one or more constraint machine learning models that are specific to the constraint; and removing from the second set any data center setting slates from the second set of data center setting slates based on the constraint scores to generate the first set of data center setting slates. One of the operating constraints may be a constraint on the temperature of the data center over a next hour and the operating property of the data center that corresponds to the operating constraint is the temperature of the data center over the next hour. One of the operating constraints may be a constraint on the pressure of the data center over a next hour and the operating property of the data center that corresponds to the operating constraint is the pressure of the data center over the next hour. Each machine learning model in the ensemble may have been trained on a different sample of training data from each other machine learning model in the ensemble or has a different model architecture from each other machine learning model in the ensemble. Data may be received that identifies a true value of the efficiency score for the data center at a time after the data center was in the current state and the current state input may be used, along with the new values for the data center settings, and the true value of the efficiency score in re-training the ensemble of machine learning models.

The subject matter described in this specification can be implemented in particular embodiments so as to realize one or more of the following advantages. An example system uses machine learning model algorithms to improve operational efficiency within data centers by modeling data center performance and predicting resource efficiency.

Data centers make optimization of operational efficiency difficult because they have complex interactions among multiple mechanical, electrical, and control systems. Data center equipment, the operation of that equipment, and the environment interact with each other in a number of operating configurations and with nonlinear interdependencies. Additionally, each data center has a unique architecture and environment. Therefore, optimizing data center parameters for one data center may not be applicable for another datacenter. Machine learning models can be trained on different operating scenarios and parameters within data centers to produce an efficient and adaptive framework that understands data center dynamics and optimizes efficiency within data centers. By applying machine learning techniques to model complex dynamics, data center control systems implement actions that are focused on long term efficiency. Machine learning models can be optimized for different criteria including: lowest power usage, lowest water usage, lowest money spent on electricity, and most possible CPU loads that can be put in a datacenter.

By being able to predict operational efficiency, engineers can plan new data centers that they know are efficient with the minimum amount of resources.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The specification generally describes an efficiency management system that provides optimization recommendations to improve efficiency within a data center.

In a data center, many possible combinations of hardware, e.g., mechanical and electrical equipment, and software, e.g., control strategies and set points, contribute to data center efficiency. For example, one of the primary sources of energy use in the data center environment is cooling. Data centers generate heat that must be removed to keep the servers running. Cooling is typically accomplished by large industrial equipment such as pumps, chillers, and cooling towers.

However, a simple change to a cold aisle temperature set point will produce load variations in the cooling infrastructures of the data center, e.g., chillers, cooling towers, heat exchangers, and pumps. These load variations cause non-linear changes in equipment efficiency. The number of possible operating configurations and various feedback loops among data center equipment, equipment operation, and the data center environment make it difficult to optimize efficiency. Testing each and every feature combination to maximize data center efficiency is unfeasible given time constraints, frequent fluctuations in data center sensor information and weather conditions, and the need to maintain a stable data center environment. Traditional engineering formulas for predictive modeling often produce large errors because they fail to capture the complex interdependencies of systems in the data center.

Figure 1:
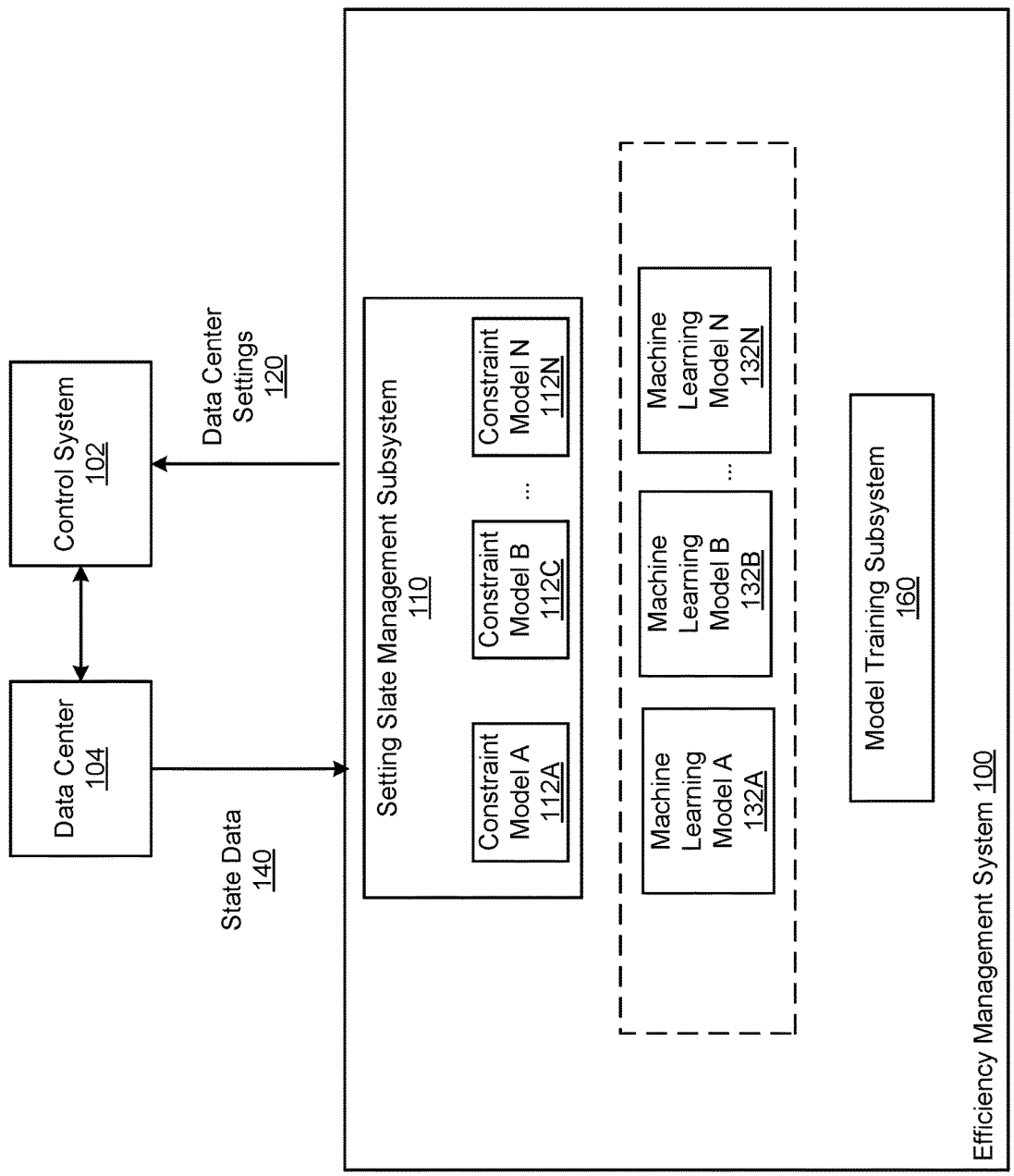
FIG. 1 is shows an example of the efficiency management system.

FIG. 1 shows an example of an efficiency management system (100). The efficiency management system (100) is an example of a system implemented as computer programs on one or more computers in one or more locations, in which the systems, components, and techniques described below can be implemented.

The efficiency management system (100) receives state data (140) characterizing the current state of a data center (104) and provides updated data center settings (120) to a control system (102) that manages the settings of the data center (104).

The efficiency management system (100) can take in, as input, state data (140) representing the current state of the data center (104). This state data (140) can come from sensor readings of sensors in the data center (104) and operating scenarios within the data center (104). The state data may include data such as temperatures, power, pump speeds, and set points.

The efficiency management system (100) uses this data to determine data center settings (120) that should be changed in the data center (104) in order to make the data center (104) more efficient.

Once the efficiency management system (100) determines the data center settings (120) that will make the data center (104) more efficient, the efficiency management system (100) provides the updated data center settings (120) to the control system (102). The control system (102) uses the updated data center settings (120) to set the data center (104) values. For example, if the efficiency management system (100) determines that an additional cooling tower should be turned on in the data center (104), the efficiency management system (100) can either provide the updated data center settings (120) to a user who updates the settings or to the control system (102), which automatically adopts the settings without user interaction. The control system (102) can send the signal to the data center to increase the number of cooling towers that are powered on and functioning in the data center (104).

The efficiency management system (100) can train an ensemble of machine learning models (132A-132N) using a model training subsystem (160) to predict the resource efficiency of the data center (104) if particular data center settings are adopted. In some cases, the efficiency management system (100) can train a single machine learning model to predict the resource efficiency of the data center if particular data center settings are adopted.

In particular, each machine learning model (132A-132N) in the ensemble is configured through training to receive a state input characterizing the current state of the data center (104) and a data center setting slate that defines a combination of possible data center settings and to process the state input and the data center setting slate to generate an efficiency score that characterizes a predicted resource efficiency of the data center if the data center settings defined by the data center setting slate are adopted.

In some implementations, the efficiency score represents a predicted power usage effectiveness (PUE) of the data center if the settings of a particular slate are adopted by the data center (104). PUE is defined as the ratio of the total building energy usage to the information technology energy usage.

In some implementations, the efficiency score represents a predicted water usage of the data center if the settings of a particular slate are adopted by the data center (104). In other implementations, the efficiency score represents a predicted monetary amount spent on electricity. In other implementations, the efficiency score represents a predicted load amount that can be put in a datacenter.

In some implementations, each machine learning model (132A-132N) is a neural network, e.g., a deep neural network, that the efficiency management system (100) can train to produce an efficiency score.

Neural networks are machine learning models that employ one or more layers of models to generate an output, e.g., one or more classifications, for a received input. Deep neural networks include one or more hidden layers in addition to an output layer. The output of each hidden layer is used as input to the next layer in the network, i.e., the next hidden layer or the output layer. Each layer of the neural network generates an output from a received input in accordance with current values of a respective set of parameters for the layer.

The model training subsystem (120) uses historical data from a data center (104) to create different datasets of sensor data from the data center. Each machine learning model (132A-132N) in the ensemble of machine learning models can be trained on one dataset of historical sensor data.

The efficiency management system (100) can train additional ensembles of constraint machine learning models (112A-112N) using the model training subsystem (160) to predict an operating property of the data center that corresponds to an operating constraint if the data center (104) adopts certain data center settings (102).

As will be described in more detail below, if the efficiency management system (100) determines that a constraint model predicts that the value of a given data center setting will violate a constraint of the data center, the efficiency management system will discard the violating setting.

Each constraint model (112A-112N) is a machine learning model, e.g., a deep neural network, that is trained to predict certain values of an operating property of the data center over a period of time if the data center adopts a given input setting. For example, the model training subsystem (160) can train one constraint model to predict the future water temperature of the data center over the next hour given input state data (140) and potential settings. The model training subsystem 120 can train another constraint model to predict the water pressure over the next hour given the state data (140) and potential settings.

A setting slate management subsystem (110) within the efficiency management system (100) preprocesses the state data (140) and constructs a set of setting slates that represent data center setting values that can be set for various parts of the data center given the known operating conditions and the current state of the data center (104). Each setting slate defines a respective combination of possible data center settings that affect the efficiency of the data center (104).

For example, the efficiency management system (100) may determine the most resource efficient settings for a cooling system of the data center (104). The cooling system may have the following architecture: (1) servers heat up the air on the server floor; (2) the air is cycled and the heat is transferred to the process water system; (3) the process water system is cycled and connects to the condenser water system using a heat sync; and (4) the condenser water system takes the heat from the process water system and transfers it to the outside air using cooling towers or large fans.

To efficiently control the cooling system, the efficiency management system (100) may construct different potential setting slates that include various temperatures for the cooling tower set points, cooling tower bypass valve positions, cooling unit condenser water pump speeds, a number of cooling units running, and/or process water differential pressure set points.

As an example, one setting slate may include the following values: 68 degrees as the temperature for the cooling tower set points, 27 degrees as the cooling tower bypass valve position, 500 rpm as the cooling unit condenser water pump speed, and 10 as the number of cooling units running.

Other examples of slate settings that impact efficiency of the data center (104) include: potential power usage across various parts of the data center; certain temperature settings across the data center; a given water pressure; specific fan or pump speeds; and a number and type of the running data center equipment such as cooling towers and water pumps.

During preprocessing, the setting slate management subsystem (110) can remove data with invalid power usage efficiency, replace missing data for a given data setting with a mean value for that data setting, and/or remove a percentage of data settings. The setting slate management system (110) discretizes all of the action dimensions and generates an exhaustive set of possible action combinations. For any continuous action dimensions, the system converts the action into a discrete set of possible values. For example, if one of the action dimensions is a valve that has a value from 0.0 to 1.0, the system may discretize the values into the set [0.0, 0.05, 0.1, 0.15, . . . , 1.0]. The system may discretize for every dimension and the full action set is every possible combination of the values. The system then removes all actions that violate the constraint models.

The setting slate management subsystem (110) sends the constructed set of setting slates and the current state of the data center (104) to the constraint models (112A-112N). The setting slate management subsystem then determines whether certain data center setting slates, if chosen by the system, are predicted to result in violations of operating constraints for the data center. The setting slate management subsystem (100) removes any data center setting slates from the set of setting slates that are predicted to violate the constraints of the data center.

The efficiency management system (100) sends the updated set of setting slates and the state data (140) to the ensemble of machine learning models (132A-132N) that use the state data and the setting slates to generate efficiency scores as output.

Since each machine learning model in the ensemble of models is trained on a different dataset than the other models, each model has the potential to provide a different predicted PUE output when all the machine learning models in the ensemble are run with the same data center setting as input. Additionally or alternatively each machine learning model may have a different architecture which could also cause each model to potentially provide a different predicted PUE output.

The efficiency management system (100) can choose data center setting values that focus on long-term efficiency of the data center. For example, some data center setting values provide long-term power usage efficiency for the data center, e.g., ensuring that the power usage in the data center is efficient for a long predetermined time after the data center was in the state characterized by the state input. Long-term power usage efficiency may be for time durations of thirty minutes, one hour, or longer from the time the data center was in the input state whereas short term power usage efficiency focuses on a short time after the data center was in the input state, e.g., immediately after or five seconds after, the data center was in the input state.

The system can optimize the machine learning models for long term efficiency so that the models can make predictions based on the dynamics of the data center and are less likely to provide recommendations for slate settings that yield good results in the short term, but are bad for efficiency over the long term. For example, the system can predict PUE over the next day, assuming that optimal actions will continue to be taken every hour. The system can then take actions that it knows will lead to the best PUE over the whole day, even if the PUE for a given hour is worse than the previous hour.

The efficiency management system (100) determines the final efficiency score for a given setting slate based on the efficiency scores of each machine learning model in the ensemble of models for a given setting slate to produce one overall efficiency score per setting slate.

The efficiency management system (100) then either recommends or selects new values for the data center settings based on the efficiency scores assigned to each slate from the machine learning models (132A-132N). The efficiency management system can send the recommendations to a data center operator to be implemented, e.g., by being presented to the data center operator on a user computer, or set automatically without needing to be sent to a data center operator.

Figure 2:
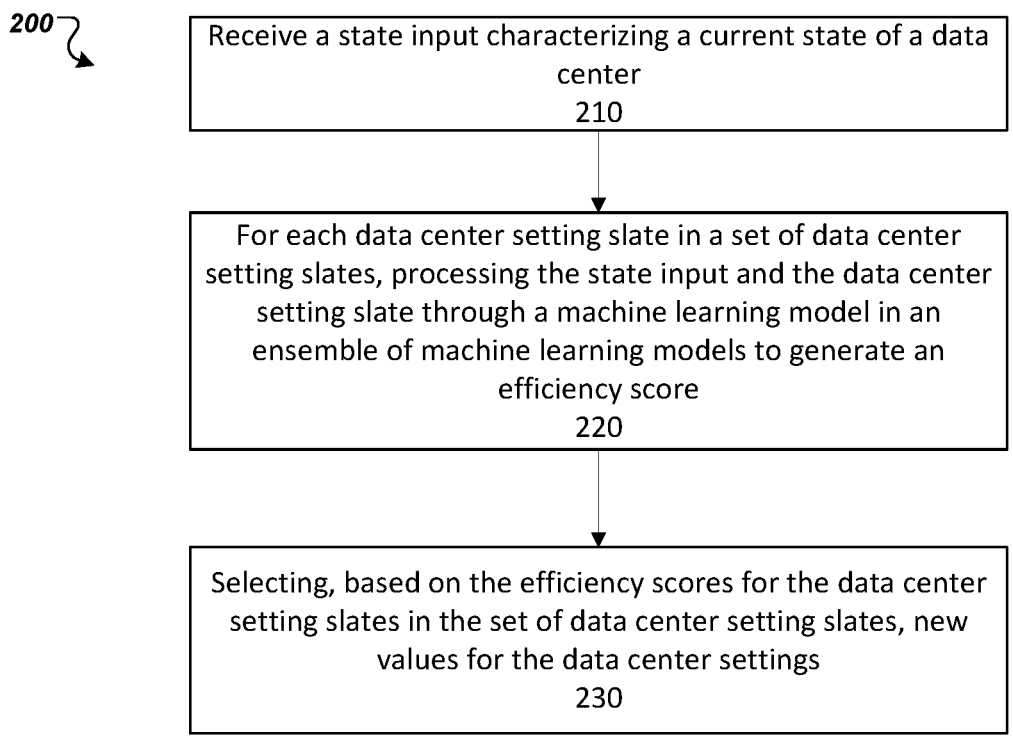
FIG. 2 is a flowchart of an example process for improving operational efficiency within a data center by modeling data center performance and predicting power usage efficiency.

FIG. 2 is a flowchart of an example process 200 for selecting a setting slate for a data center using an ensemble of machine learning models. For convenience, the process 200 will be described as being performed by a system of one or more computers, located in one or more locations, and programmed appropriately in accordance with this specification. For example, an efficiency management system, e.g., the efficiency management system 100 of FIG. 1, appropriately programmed, can perform the process 200.

The system receives a state input representing a current state of a data center (210) and generates a set of setting slates. As disclosed above, each setting slate defines a respective combination of possible data center settings or actions that affect the efficiency of the data center given the current state of the data center. The system sends the set of setting slates to the constraint models to determine whether any of the setting slates are predicted to violate constraints of the data center. The system then removes data center setting slates from the set of setting slates that are predicted to violate the constraints.

For each data center setting slate in the set of data center setting slates, the system processes the state input and the data center setting slate through each machine learning model in an ensemble of machine learning models to generate an efficiency score for each machine learning model (220). Since each machine learning model is trained on a different dataset, each machine learning model has the potential to provide a different efficiency score for a setting slate than the other machine learning models.

The system then selects an overall efficiency score for the setting slate based on the efficiency scores generated by each machine learning model for the setting slate.

Each model in the ensemble of machine learning models provides a predicted PUE for each data center setting slate. To determine the final predicted PUE for a setting slate, the system can use various methods including: choosing the predicted PUE with the lowest mean or using a pessimistic or optimistic algorithm to determine a final predicted PUE.

To choose the predicted PUE with the lowest mean, the system determines the mean value of the predicted PUE scores output by the ensemble of models. The efficiency management system then chooses the predicted PUE with the lowest mean.

In some other implementations, for each data center setting slate, the system determines an aggregate efficiency score from the efficiency scores generated for the data center setting slate by the ensemble of models, e.g., a mean or other measure of central tendency of the efficiency scores. The system then determines a measure of variation, e.g., a standard deviation, of the efficiency scores generated for the data center setting slate by the ensemble of models. The data center setting slates are then ranked based on the aggregated efficiency scores and the measures of variation. The system selects the combination of possible data center settings that are defined by a highest-ranked data center setting slate.

For example, in some instances, the system determines the ranking using a pessimistic algorithm that is used for exploitation or an optimistic algorithm that is used for exploration.

In exploitation mode, the system ranks the data center slates in an exploitative manner by penalizing data center setting slates that have higher measures of variation more in the ranking than data center setting slates that have lower measures of variation. For example, the system can generate the ranking by, for each setting slate, determining a final predicted PUE by adding $\lambda_1$ multiplied by the standard deviation of the PUE value to the mean PUE, with $\lambda_1$ being a predetermined constant value and then ranking the setting slates by their final predicted PUEs.

In exploration mode, the system ranks the data center slates in an explorative manner by promoting data center setting slates that have higher measures of variation more in the ranking than data center setting slates that have lower measures of variation. For example, the system can generate the ranking by, for each setting slate, determining a final predicted PUE by subtracting $\lambda_1$ multiplied by the standard deviation of the target value from the mean PUE value, with $\lambda_1$ being a predetermined constant value and then ranking the setting slates by their final predicted PUEs.

The models can be fast learning models that have memory architectures and are taught to remember bad actions, including actions that make the data center less efficient.

The system selects, based on the efficiency scores for the data center setting slates in the set of data center setting slates, new values for the data center settings (230). The system then recommends the selected data setting values to the control system to update the settings of the data center. In some implementations, the system generates recommendations on a per time step basis and displays them to the control system so that the data center operators can take action and update the data center settings. In other implementations, the system uses the data settings to automatically update the data center without human interaction.

Figure 3:
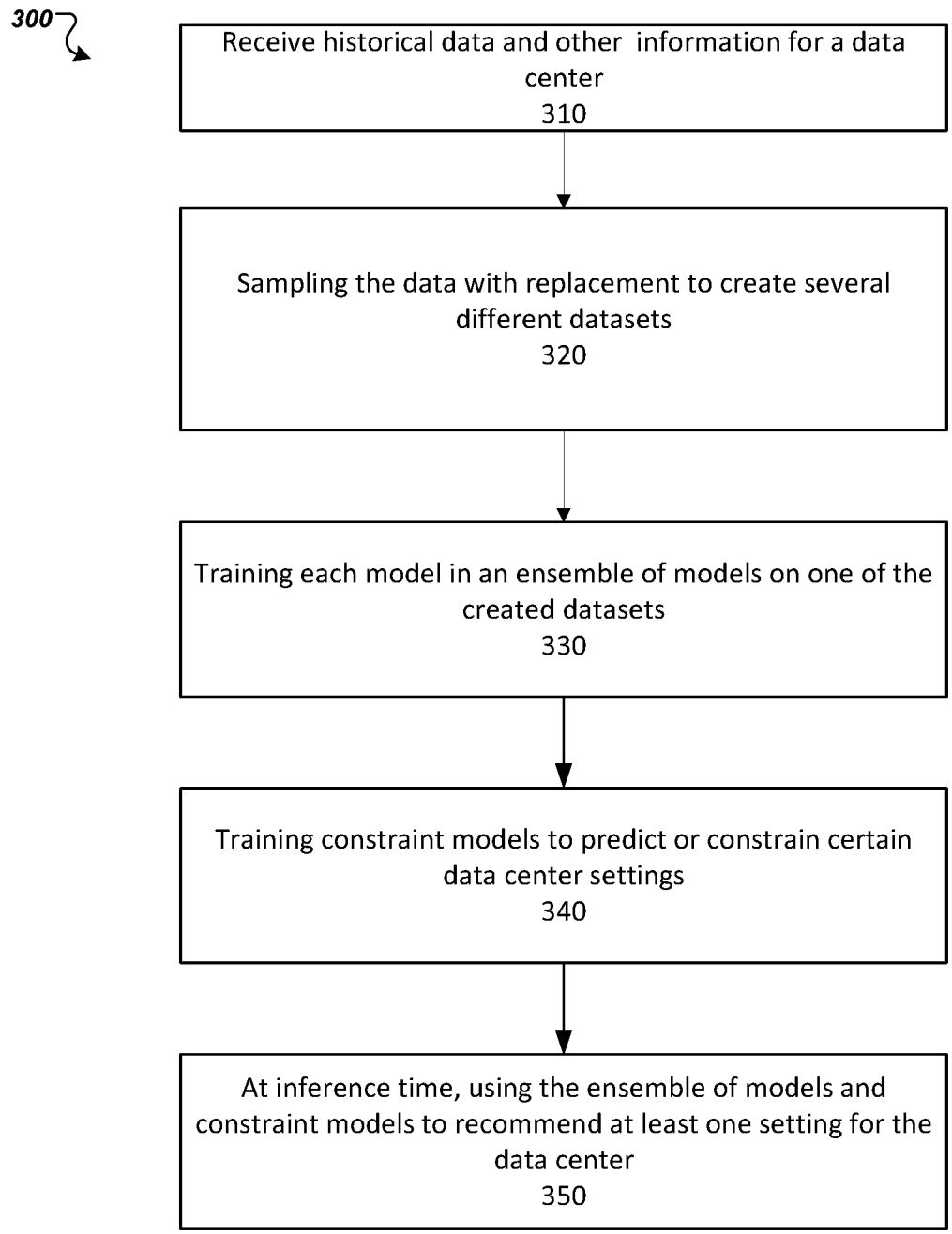
FIG. 3 is a flowchart of an example process for training ensembles of models to predict power usage efficiency.

FIG. 3 is a flowchart of an example process 300 for training ensembles of models to predict power usage efficiency for a given data center setting slate. For convenience, the process 300 will be described as being performed by a system of one or more computers, located in one or more locations, and programmed appropriately in accordance with this specification. For example, an efficiency management system, e.g., the efficiency management system 100 of FIG. 1, appropriately programmed, can perform the process 300.

As disclosed above, the system (100) uses historical data from data centers as well as other information to train the ensembles of machine learning models to determine efficiency scores (310). The historical data can come from past sensor readings from sensors across the data center. Example data includes: power usage across various parts of a data center such as the server floor, cooling system, networking room, and individual fans; temperature sensors across the data center such as in the water cooling system, on the server floor, and in the chiller; water and/or air speed in various parts of the data center such as the differential pressure of the server floor air and the differential pressure in the water cooling system; fan and/or pump speeds such as the cooling tower fan speeds and the process water pump speed; weather, i.e., the outside air temperature, humidity, and/or air pressure, and forecasts of future weather; and equipment status, i.e., whether the chiller is running, how many cooling towers are on and how many pumps are running.

The system then samples the data with replacement to create different datasets for each machine learning model in the ensemble, e.g., 10 (320).

The system trains several machine learning models to produce an ensemble of models that each predict an average future power usage effectiveness (PUE) given a potential data center setting slate as model input (330). The system trains each machine learning model on one of the created datasets. The models use supervised learning algorithms to analyze training data and produce inferred functions. The models contain a reinforcement learning loop that provides delayed feedback that uses a reward signal. In this loop, models map from state to action and evaluate the tradeoff between exploration and exploitation actions.

During training, the model training subsystem (120) uses techniques of deep learning including batch normalization, dropout, rectified linear units, early stopping, and other techniques to train the models. The system can train models using bootstrapping to obtain estimates of the mean and variance for each prediction which allows the models to incorporate uncertainty into their predictions. By incorporating uncertainty, models operate in a more stable manner.

The system also trains constraint models to predict and/or constrain certain data center settings (340). Trained models can be transferred among data centers so that new data centers have models that are trained on real-time data so that the data centers have optimized settings for data center efficiency.

At inference time, the system uses the ensemble of models and the constrain models to recommend a setting slate for the data center (350). As described above, the system constructs a set of setting slates within the known operating conditions of the data center. The system also looks at the current state of the data center using the data center sensors. The set of setting slates and the current state of the data center are run through the constraint models to remove any settings that are predicted to violate constraints of the data center. The reduced set of setting slates and the current state of the data center are run through the ensemble of models. These models can be trained to predict power usage efficiency. The system selects the setting slate with the lowest predicted power usage efficiency. The system can then either send the setting slate as a recommendation to a data center operator or use the setting slate to directly control the data center settings or equipment. The system may generate the recommendations on a per time-step basis, e.g., hourly. Long term planning becomes more important for the system the more often recommendations are provided.

Optionally, the system can re-train the models using true values of the efficiency scores for the data center after the setting slates recommended by the system have been adopted. That is, the system can receive data identifying a true value of the efficiency score for the data center at a time after the data center was in a current state and use the current state input characterizing the current state, the new values for the data center settings that were recommended by the system, and the true value of the efficiency score in re-training the ensemble of machine learning models, e.g., after a threshold number of true values have been received or in response to determining that the performance of the machine learning models has deteriorated.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
receiving a state input characterizing a current state of a facility having one or more computer servers for processing data and mechanical and electrical equipment and controlled by control software;
obtaining a first set of facility setting slates that each define a respective combination of possible facility settings that affect a resource efficiency of the facility;
for each facility setting slate in the first set of facility setting slates:
determining, for each of a plurality of operating constraints for the facility, a prediction of whether the operating constraint would be violated if facility settings defined by the facility setting slate are adopted in response to receiving the state input;
generating a filtered set of facility setting slates that includes only the facility setting slates from the first set of facility setting slates that are predicted to not violate any of the plurality of operating constraints;
generating a plurality of efficiency scores for the filtered set of facility setting slates, the generating comprising:
for each facility setting slate in the filtered set of facility setting slates, processing the state input and the facility setting slate through each first deep neural network in an ensemble of first deep neural networks, wherein each first deep neural network in the ensemble comprises one or more hidden layers and an output layer, and wherein each first deep neural network in the ensemble has been configured through training on training data that comprises historical data from past sensor readings from one or more sensors to:
receive the state input and the facility setting slate, and
process the state input and the facility setting slate to generate an efficiency score that characterizes a predicted resource efficiency of the facility if the facility settings defined by the facility setting slate are adopted in response to receiving the state input; and
selecting, based on the plurality of efficiency scores for the facility setting slates in the filtered set of facility setting slates, new values for the facility settings.

2. The method of claim 1, wherein each first deep neural network in the ensemble has been trained on the training data that comprises historical data from past sensor readings through a reinforcement learning loop that uses a reward signal.

3. The method of claim 1, wherein for each facility setting slate in the first set of facility setting slates, determining the prediction of whether the operating constraint would be violated comprises:
processing the state input and the facility setting slate to generate a constraint score associated with the operating constraint for the facility, through each second deep neural network of an ensemble of second deep neural networks specific to the operating constraint,
wherein the constraint score characterizes a predicted value of an operating property of the facility if the facility settings defined by the facility setting slate are adopted in response to receiving the state input; and
determining whether the operating constraint would be violated based on determining whether the constraint score associated with the operating constraint satisfies a respective predetermined threshold.

4. The method of claim 3, wherein generating the constraint score further comprises:
obtaining a respective candidate constraint score from each second deep neural network of the ensemble of second deep neural networks by processing the state input and the facility setting slate using a corresponding second deep neural network; and
generating the constraint score based on a measure of central tendency of the respective candidate constraint scores.

5. The method of claim 1, wherein selecting, based on the plurality of efficiency scores for the facility setting slates in the filtered set of facility setting slates, new values for the facility settings further comprises:
for each facility setting slate of the filtered set of facility setting slates:
obtaining a respective efficiency score from each first deep neural network of the ensemble of first deep neural networks by processing the state input and the facility setting slate using a corresponding first deep neural network; and
generating a respective optimized efficiency score for the facility setting slate based on a measure of central tendency of the respective efficiency scores; and
selecting, based on the respective optimized efficiency scores, new values for the facility settings.

6. The method of claim 1, wherein selecting, based on the plurality of efficiency scores for the facility setting slates in the filtered set of facility setting slates, new values for the facility settings further comprises:
for each facility setting slate of the filtered set of facility setting slates, determining a respective optimized efficiency score based on the plurality of efficiency scores obtained for the facility setting slate using the ensemble of first deep neural networks;
selecting a facility setting slate, from the filtered set of facility setting slates, that has a highest optimized efficiency score; and
selecting, as the new values, values represented by the facility settings of the selected facility setting slate.

7. The method of claim 1, wherein the efficiency score comprises a predicted long-term power usage effectiveness of the facility.

8. The method of claim 2, wherein each first deep neural network in the ensemble has been re-trained on observed efficiency scores for the facility, wherein the observed efficiency scores have been observed after facility setting slates selected using the ensemble of the first deep neural networks have been adopted.

9. A system comprising:
one or more computers and one or more storage devices on which are stored instructions that are operable, when executed by the one or more computers, to cause the one or more computers to perform operations comprising:

receiving a state input characterizing a current state of a facility having one or more computer servers for processing data and mechanical and electrical equipment and controlled by control software;

obtaining a first set of facility setting slates that each define a respective combination of possible facility settings that affect a resource efficiency of the facility;

for each facility setting slate in the first set of facility setting slates:
  determining, for each of a plurality of operating constraints for the facility, a prediction of whether the operating constraint would be violated if facility settings defined by the facility setting slate are adopted in response to receiving the state input;

generating a filtered set of facility setting slates that includes only the facility setting slates from the first set of facility setting slates that are predicted to not violate any of the plurality of operating constraints;

generating a plurality of efficiency scores for the filtered set of facility setting slates, the generating comprising:
  for each facility setting slate in the filtered set of facility setting slates, processing the state input and the facility setting slate through each first deep neural network in an ensemble of first deep neural networks, wherein each first deep neural network in the ensemble comprises one or more hidden layers and an output layer, and wherein each first deep neural network in the ensemble has been configured through training on training data that comprises historical data from past sensor readings from one or more sensors to:
    receive the state input and the facility setting slate, and
    process the state input and the facility setting slate to generate an efficiency score that characterizes a predicted resource efficiency of the facility if the facility settings defined by the facility setting slate are adopted in response to receiving the state input; and selecting, based on the plurality of efficiency scores for the facility setting slates in the filtered set of facility setting slates, new values for the facility settings.

10. The system of claim 9, wherein each first deep neural network in the ensemble has been trained on the training data that comprises historical data from past sensor readings through a reinforcement learning loop that uses a reward signal.

11. The system of claim 9, wherein for each facility setting slate in the first set of facility setting slates, determining the prediction of whether the operating constraint would be violated comprises:
  processing the state input and the facility setting slate to generate a constraint score associated with the operating constraint for the facility, through each second deep neural network of an ensemble of second deep neural networks specific to the operating constraint,
  wherein the constraint score characterizes a predicted value of an operating property of the facility if the facility settings defined by the facility setting slate are adopted in response to receiving the state input; and
  determining whether the operating constraint would be violated based on determining whether the constraint score associated with the operating constraint satisfies a respective predetermined threshold.

12. The system of claim 11, wherein generating the constraint score further comprises:
  obtaining a respective candidate constraint score from each second deep neural network of the ensemble of second deep neural networks by processing the state input and the facility setting slate using a corresponding second deep neural network; and
  generating the constraint score based on a measure of central tendency of the respective candidate constraint scores.

13. The system of claim 9, wherein selecting, based on the plurality of efficiency scores for the facility setting slates in the filtered set of facility setting slates, new values for the facility settings further comprises:
  for each facility setting slate of the filtered set of facility setting slates:
    obtaining a respective efficiency score from each first deep neural network of the ensemble of first deep neural networks by processing the state input and the facility setting slate using a corresponding first deep neural network; and
    generating a respective optimized efficiency score for the facility setting slate based on a measure of central tendency of the respective efficiency scores; and
  selecting, based on the respective optimized efficiency scores, new values for the facility settings.

14. The system of claim 9, wherein selecting, based on the plurality of efficiency scores for the facility setting slates in the filtered set of facility setting slates, new values for the facility settings further comprises:
  for each facility setting slate of the filtered set of facility setting slates, determining a respective optimized efficiency score based on the plurality of efficiency scores obtained for the facility setting slate using the ensemble of first deep neural networks;
  selecting a facility setting slate, from the filtered set of facility setting slates, that has a highest optimized efficiency score; and
  selecting, as the new values, values represented by the facility settings of the selected facility setting slate.

15. One or more non-transitory computer readable storage media encoded with instructions that, when executed by one or more computers, cause the one or more computers to perform operations comprising:
  receiving a state input characterizing a current state of a facility having one or more computer servers for processing data and mechanical and electrical equipment and controlled by control software;
  obtaining a first set of facility setting slates that each define a respective combination of possible facility settings that affect a resource efficiency of the facility;
  for each facility setting slate in the first set of facility setting slates:
    determining, for each of a plurality of operating constraints for the facility, a prediction of whether the operating constraint would be violated if facility settings defined by the facility setting slate are adopted in response to receiving the state input;
  generating a filtered set of facility setting slates that includes only the facility setting slates from the first set of facility setting slates that are predicted to not violate any of the plurality of operating constraints;
  generating a plurality of efficiency scores for the filtered set of facility setting slates, the generating comprising:
    for each facility setting slate in the filtered set of facility setting slates, processing state input and the facility setting slate through each first deep neural network in an ensemble of first deep neural networks, wherein each first deep neural network in the ensemble comprises one or more hidden layers and an output layer, and wherein each first deep neural network in the ensemble has been configured through training on training data that comprises historical data from past sensor readings from one or more sensors to:
receive the state input and the facility setting slate, and process the state input and the facility setting slate to generate an efficiency score that characterizes a predicted resource efficiency of the facility if the facility settings defined by the facility setting slate are adopted in response to receiving the state input; and
selecting, based on the plurality of efficiency scores for the facility setting slates in the filtered set of facility setting slates, new values for the facility settings.

16. The computer readable storage media of claim 15, wherein each first deep neural network in the ensemble has been trained on the training data that comprises historical data from past sensor readings through a reinforcement learning loop that uses a reward signal.

17. The computer readable storage media of claim 15, wherein for each facility setting slate in the first set of facility setting slates, determining the prediction of whether the operating constraint would be violated comprises:
processing the state input and the facility setting slate to generate a constraint score associated with the operating constraint for the facility, through each second deep neural network of an ensemble of second deep neural networks specific to the operating constraint,
wherein the constraint score characterizes a predicted value of an operating property of the facility if the facility settings defined by the facility setting slate are adopted in response to receiving the state input; and
determining whether the operating constraint would be violated based on determining whether the constraint score associated with the operating constraint satisfies a respective predetermined threshold.

18. The computer readable storage media of claim 17, wherein generating the constraint score further comprises:
obtaining a respective candidate constraint score from each second deep neural network of the ensemble of second deep neural networks by processing the state input and the facility setting slate using a corresponding second deep neural network; and
generating the constraint score based on a measure of central tendency of the respective candidate constraint scores.

19. The computer readable storage media of claim 15, wherein
selecting, based on the plurality of efficiency scores for the facility setting slates in the filtered set of facility setting slates, new values for the facility settings further comprises:
for each facility setting slate of the filtered set of facility setting slates:
obtaining a respective efficiency score from each first deep neural network of the ensemble of first deep neural networks by processing the state input and the facility setting slate using a corresponding first deep neural network; and
generating a respective optimized efficiency score for the facility setting slate based on a measure of central tendency of the respective efficiency scores; and
selecting, based on the respective optimized efficiency scores, new values for the facility settings.

20. The computer readable storage media of claim 15, wherein selecting, based on the plurality of efficiency scores for the facility setting slates in the filtered set of facility setting slates, new values for the facility settings further comprises:
for each facility setting slate of the filtered set of facility setting slates, determining a respective optimized efficiency score based on the plurality of efficiency scores obtained for the facility setting slate using the ensemble of first deep neural networks;
selecting a facility setting slate, from the filtered set of facility setting slates, that has a highest optimized efficiency score; and
selecting, as the new values, values represented by the facility settings of the selected facility setting slate.

* * * * *